United States Patent [19]

Kasama et al.

[11] 4,316,874
[45] Feb. 23, 1982

[54] GAS GENERATOR UTILIZING GRANULAR SILICON CARBIDE AS COOLANT

[75] Inventors: Tsuneo Kasama; Hikaru Fujiyama, both of Kawagoe; Tadahiko Nagaoka, Sayama; Masayoshi Katoh, Kawagoe, all of Japan

[73] Assignees: Nissan Motor Co., Ltd.; Nippon Oil & Fats Co., Ltd., both of Japan

[21] Appl. No.: 183,585

[22] Filed: Sep. 2, 1980

Related U.S. Application Data

[63] Continuation of Ser. No. 43,118, May 29, 1979, abandoned.

[30] Foreign Application Priority Data

May 29, 1978 [JP] Japan .................................. 53-63364

[51] Int. Cl.³ .......................... A62B 7/08; B01J 19/00
[52] U.S. Cl. ................................... 422/126; 280/741; 422/166; 422/167
[58] Field of Search ................. 280/741; 422/120, 126, 422/166, 167

[56] References Cited

U.S. PATENT DOCUMENTS 4,068,862 1/1978 Ishi et al. ............................ 280/740

FOREIGN PATENT DOCUMENTS 2541724 4/1976 Fed. Rep. of Germany ...... 422/305
1500157 8/1978 United Kingdom .

OTHER PUBLICATIONS

Merck Index, p. 8238, Silicon Carbide, 8th Ed. 1976.

*Primary Examiner*—Michael S. Marcus
*Attorney, Agent, or Firm*—Schwartz, Jeffery, Schwaab, Mack, Blumenthal & Koch

[57] ABSTRACT

A gas generator for instantaneously supplying a gas to an inflatable bag such as a gas bag for protection of a car passenger from injuries in a collision, of the type comprising a solid gas-generating composition confined in a reaction chamber defined in a housing having a perforated wall. The reaction chamber is bounded by a wire screen which is spaced from the perforated wall, and another wire screen is arranged along the inside of the perforated wall. Adequately sized granules of SiC are packed in a space bounded by the two wire screens to efficiently absorb heat and remove solid matter from the generated gas without offering an unduly great resistance to the gas flow. Best cooling and filtering effects can be gained by the use of α-SiC granules of a sharp-edged particle shape.

4 Claims, 2 Drawing Figures

1 mm

GAS GENERATOR UTILIZING GRANULAR SILICON CARBIDE AS COOLANT

This is a continuation, of application Ser. No. 043,118, filed May 29, 1979, abandoned.

BACKGROUND OF THE INVENTION

This invention relates to a gas generator for quickly supplying a large volume of gas to an inflatable bag type safety apparatus such as a gas bag for the protection of a car passenger in collision of the car, and more particularly to a gas generator of the type comprising a gas-generating composition confined in an apertured housing and a granular coolant which intervenes between the gas-generating composition and an apertured wall of the housing.

A recently developed automotive safety system includes an inflatable bag that momentarily and temporarily restrains a passenger and exhibits a cushioning effect during the critical instant of a collision impact.

A gas generator for use in such a system to quickly inflate the bag in case of need is desired to fully satisfy all of the following requirements:

(1) to be able to quickly produce a sufficiently large volume of gas upon initiation;
(2) to be small in size so as to be installed in a narrow space, for example in a steering column, and light in weight so as not to hamper the ease of steering;
(3) to be assuredly free from the possibility of explosion during operation or accidental firing by the influence of shocks;
(4) to discharge a gas of which temperature is not so high as will cause the passenger to suffer burns upon contact with the inflated bag;
(5) to discharge a non-toxic gas; and
(6) to be stable over a long period of time, that is, to undergo no or little changes with the passage of time.

Considering the degrees of satisfactoriness in the important items such as quickness of gas generation, smallness in size and lightness in weight and safeness from explosion or accidental actuation, a gas generator of the type utilizing a solid gas-generating composition is advantageous over an another type of gas generator that is a pressure vessel confining therein either a pressurized gas or a liquefied gas as a component of an automotive gas bag system.

However, the use of a solid-gas-generating composition makes it necessary to take a certain measure for lowering the gas temperature since such a composition produces a gas by an exothermic decomposition reaction or combustion which proceeds at a very high rate so that the produced gas has an undesirably high temperature. Besides, sometimes the gas contains certain amounts of toxic reaction products and/or solid matter that may damage the inflatable bag. Therefore, it is also necessary to remove the toxic reaction products and the harmful solid matter from the generated gas.

To meet these requirements, gas generators comprising at least one cooling and filtering layer have been proposed in a variety of designs. Typical examples of the hitherto proposed techniques are as follows.

Japanese Patent Application, Primary Publication No. 49(1974)-13837 shows a gas generator comprising a cooling and filtering layer which is made of a wire screen or entwined fine wire of a metal having a high heat conductivity as exemplified by iron or steel, aluminum or copper. A disadvantage of this method is the necessity of using the wire screen or entwined wire in a large weight because every metal is relatively small in specific heat, resulting in an inevitable enlargement of the overall volume of the device. Moreover, the total weight of the device also increases because of the provision of a cooling layer of a metal, a material relatively large in specific gravity.

Then it has been proposed to use a certain compound which is endothermically decomposable and has a smaller specific gravity than metals, for example sodium hydrogen carbonate or ammonium carbonate, as a coolant in a gas generator by, for example, U.S. Pat. Nos. 3,305,319 and 3,515,518 and Japanese Patent Application, Primary Publication No. 50(1975)-146039. However, endothermically decomposable compounds are generally unsatisfactory in the rate of decomposition reaction and/or stability during long time storage.

Therefore, it is more popular to utilize a more stable heat-absorbing material such as alumina or silica in the form of fine granules as described in, for example, U.S. Pat. No. 3,785,674 and Japanese Patent Application, Primary Publication No. 52(1977)-130492. However, also this method is unsatisfactory in that the heat-absorbing material is relatively low in the cooling effect and hence needs to be used in a large weight and in the form of very fine granules to have a sufficiently large surface area relative to the weight and that the housing of the gas generator needs to have an augmented pressure resistance with an inevitable increase in weight because the employment of close packing of the fine granules of the heat-absorbing material to enhance the cooling effect offers a significant resistance to the flow of the gas generated in the gas generator housing.

Japanese Patent Application, Primary Publication No. 50(1975)-48797 discloses a gas generator comprising a porous and platy or tubular member made of a heat-absorbing material selected from a group of metal oxides including alumina and silica and a group of metal carbides including silicon carbide. This method has advantages such as enhanced cooling and filtering effects, uniformity and stableness of the enhanced effects and ease of assemblage of the device but involves a problem that the porous member offers a significant resistance to the gas flow.

In general, the temperature of a definite quantity of gas supplied from a gas generator containing a definite weight of gas-generating composition to an inflatable bag, assuming that the bag has a definite volume, is proportional to the pressure in the inflated bag according to the Boyle-Charles' law.

If the pressure in the inflated bag is not sufficiently high the bag may be squashed by the passenger subjected to a collision impact with the danger of the passenger colliding against a rigid member at the bottom of the bag. On the other hand, if the bag pressure is excessively high the bag will not serve an adequate cushioning effect but will impetuously repulse the passenger. The pressure in the inflated bag, therefore, must be within an appropriately predetermined range and, hence, the gas temperature must be within a predetermined range. When it is sure that the gas temperature does not exceed the upper boundary of the predetermined range, meaning that the gas generator contains a coolant which is high in cooling efficiency and always exhibits an expected cooling effect, it becomes unnecessary to add a considerable margin to the calculated quantity of the coolant so that it becomes possible to reduce the total weight of the gas generator. From another viewpoint, in case that a granular coolant inherently very high in cooling effect can be employed the mean particle size of the coolant granules can be made larger than the extremely small particle sizes required of less effective coolants such that the granules in a packed state offer less resistance to the gas flow in the gas generator. This results in lowering of the gas pressure in the gas generator, so that the housing of this device is allowed to have a lessened pressure resistance and therefore can be made lighter in weight.

SUMMARY OF THE INVENTION

It is an object of the present invention to provide an improved gas generator of the type comprising a solid gas-generating composition and a granular coolant confined in an apertured housing, wherein the granular coolant is exceedingly high in cooling effect on the gas generated by the decomposition or combustion of the gas-generating composition and excellent in stableness during long time storage and, besides, can efficiently trap harmful solid matter contained in the generated gas.

It is another object of the invention to provide an improved gas generator of the above stated type, which gas generator is suitable for use in combination with an inflatable bag which serves as a safety apparatus as typified by a gas bag for momentary and temporary restraint of a car passenger in the case of collision of the car.

A gas generator according to the invention comprises a housing having a wall formed with a plurality of gas discharge apertures. A first metal partition is arranged in the housing at a distance from the apertured wall so as to define a reaction chamber, which is spaced from the apertured wall, in the interior of the housing, and a second metal partition is arranged in the housing along the inside of the apertured wall such that a cooling chamber is defined between the first and second partitions. The gas generator further comprises pellets, tablets or granules of a solid gas-generating composition, which undergoes an exothermic reaction when ignited with generation of a heated reaction gas, confined in the reaction chamber, an electrically initiatable igniter attached to the housing so as to ignite the pellets in the reaction chamber and granules of silicon carbide confined in the cooling chamber. Each of the first and second metal partitions has a multiplicity of openings to allow the reaction gas to pass therethrough, and these openings are smaller than the gas-generating pellets and smaller than the silicon carbide granules. The silicon carbide granules serve as a coolant to absorb heat from the reaction gas during passage of the reaction gas through the cooling chamber.

Preferably use is made of α-silicon carbide as the coolant in this gas generator, and also preferably the silicon carbide granules are not spherical or rounded but at least a major portion of the granules have a sharp-edged particle shape such as a generally pyramidical shape or a generally prismatic shape.

Preferably each of the first and second metal partitions is a wire screen, and most preferably the ratio of the particle size of each silicon carbide granule to the size of the openings of the wire screens is in the range from 1.4 to 4.0.

It is preferable that the gas-generating composition is one that generates nitrogen gas at least as a major component of the reaction gas. A preferred example of such a type of gas-generating composition is a mixture of a metal azide and an oxidizer such as a perchlorate.

Since silicon carbide is far higher in heat conductivity than conventionally used heat-absorbing compounds typified by alumina and accordingly is superior in heat-absorbing ability, the particle size of the silicon granules in a gas generator according to the invention can be made larger than the particle sizes of coolant granules in conventional gas generators of the analogous types, and also it is possible to reduce the total weight of the coolant. Accordingly, the silicon carbide granules packed in the cooling chamber allows the reaction gas to permeate therethrough without offering an undesirably great resistance to the gas flow. This results in lowering of the maximum gas pressure in the housing and, hence, makes it possible to reduce the weight of the housing and total weight of the gas generator. By the employment of the preferred shape of the silicon carbide granules and the preferred ratio of the particle size to the screen opening size, the silicon carbide granules packed in the cooling chamber become highly effective also as a filter to trap solid matter or solid residues of the gas-generating reaction contained in the reaction gas.

A gas generator according to the invention is quite suitable to a gas bag system for the protection of a car passenger but also can be applied to other various apparatus including lifeboats and life-buoys.

DESCRIPTION OF THE PREFERRED EMBODIMENTS

Figure 1:
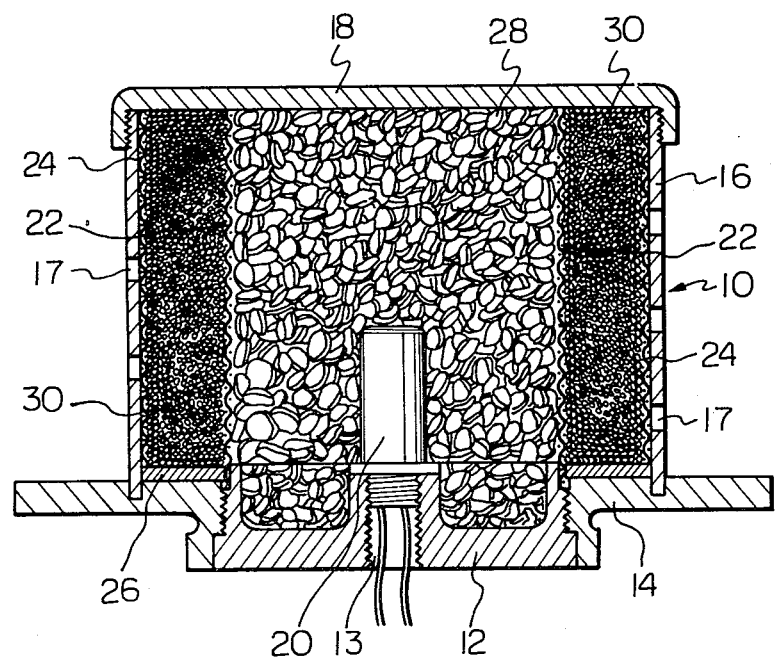
FIG. 1 is a sectional view of a gas generator as an embodiment of the present invention.

As is known, silicon carbide SiC exists in two different crystal systems, namely, α-SiC that is a hexagonal system and rhombohedral and β-SiC that is a cubic system. The present invention prefers the use of α-SiC which is higher both in melting point and in hardness than β-SiC. Since β-SiC is rather brittle, the use of β-SiC as a granular coolant in a gas generator offers a disadvantage that, where the gas generator is subjected to mechanical vibrations, for example, during running of an automobile, the granules tend to be crushed and partly pulverized by rubbing against each other.

As mentioned hereinbefore, granular alumina (usually α-alumina) has been used as a coolant in conventional gas generators comprising a solid gas-generating composition. The following Table 1 gives a comparison between α-SiC and α-$Al_2O_3$ with respect to specific heat and heat conductivity, i.e. physical properties important to solid coolants. As seen in this Table, SiC is distinctly higher in heat conductivity than $Al_2O_3$ and accordingly is superior as a coolant to absorb heat from a gas.

TABLE 1

| | α-SiC | α-$Al_2O_3$ |
|---|---|---|
| Specific Heat (cal/g · °C.) | 0.28 (500° C.) 0.31 (1000° C.) | 0.26 (20–900° C.) |
| Heat Conductivity (Kcal/m · hr · °C.) | 86 (200° C.) 18 (1000° C.) | 21 (200° C.) 6 (1000° C.) |

A granular silicon carbide for use in a gas generator according to the invention can be prepared, for example, by heating a mixture of siliceous sand and a carbonacious material such as coke in an electric furnace at a temperature of 1800°-1900° C. to cause a reaction which gives silicon carbide, crushing the thus formed silicon carbide, followed by a purification process mainly to remove iron, and finally sieving the crushed silicon carbide to obtain granules within a desirable range of particle size.

It is not a requisite but is very preferable that the granular silicon carbide for use in the present invention does not have a generally spherical or rounded particle shape but has a sharp-edged particle shape such as a generally pyramidical shape (typically, generally quadrate pyramidical) or a prismatic shape (typically, generally triangular prismatic). Compared with spherical or rounded granules, pyramidical or prismatic granules of the same weight give a larger surface area and, besides, provide more complicated gas passages, so that granules of the latter particle shape are more effective both in absorption of heat from a gas passing through the packed granules and in trapping of solid matter contained in the gas such as solid residues of combustion of the gas-generating composition.

The particle size of the silicon carbide granules may be determined optionally depending on the design of the gas generator, but it is preferable that the particle size of each granule (represented by the maximum dimension in width directions) falls within the range from about 0.5 mm to about 2.0 mm with consideration of both the cooling effect and resistance to the gas flow of the granules packed in a cooling chamber of the gas generator.

As stated above in the summary of the invention, the silicon carbide granules in a gas generator according to the invention are packed in a space bounded by two partitions each having a multiplicity of openings of a size adequate to prevent the granules from passing therethrough. Since the silicon carbide granules are not so large in particle size (preferably not larger than about 2 mm), it is very preferable that each of the two partitions is a wire screen such as of stainless steel. In this case a wire screen of appropriate openings should be selected with due consideration of the particle size of the granular silicon carbide. Preferably the openings of each wire screen has such openings that the ratio of the particle size of each granule of silicon carbide to the size of the screen openings falls within the range from 4.0 to 1.4. When this ratio is made greater than 4.0, the openings of the wire screens are significantly blocked or choked by the silicon carbide granules, and this becomes a cause for an unwanted rise in the maximum gas pressure in the gas generator housing. On the other hand, when this ratio is smaller than 1.4 a portion of the silicon carbide granules are liable to be forced to pass through the screen openings and thrusted out of the gas generator housing by the generated gas. This results in that the gas temperature is not lowered to an expected level within the gas generator and, therefore, that the gas flows into the inflatable bag at an excessively high temperature and may damage the bag.

A gas generator according to the invention utilizes a conventional solid gas-generating composition, and particularly preferably a composition that generates nitrogen gas. In the art of gas generators of the herein described type, it is popular to use a metal azide, and more specifically either an alkali metal azide such as sodium azide or lithium azide or an alkaline-earth metal azide such as calcium azide, as a nitrogen-containing component of a composition for generating nitrogen gas. For example, the gas-generating composition in a gas generator according to the invention may be a mixture of a metal azide and an oxidizer such as potassium perchlorate or sodium perchlorate, a mixture of a metal azide and an oxidizing metal oxide such as copper oxide or iron oxide, a mixture of a metal azide and a suitable metal halide such as chromic chloride or stannous chloride or a mixture of a metal azide, an oxidizer and a reducing agent such as magnesium or iron. The composition may optionally contain a small amount of a binder or a lubricant.

A mixture of sodium azide and potassium perchlorate is a typical and preferred example of nitrogen-generating compositions. Stoichiometrically, the nitrogen-generating reaction of this mixture is expressed by the following formula:

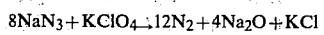

$$8NaN_3 + KClO_4 \rightarrow 12N_2 + 4Na_2O + KCl$$

If the amount of potassium perchlorate is insufficient, the decomposition of this mixture liberates a certain quantity of metallic sodium. Both metallic sodium and sodium oxide are harmful and, therefore, should be trapped within the gas generator.

As is usual, the gas-generating composition in a gas generator of the invention is in the form of pellets. Herein the term "pellets" should not be taken strictly literally but should be construed as to include tablets and relatively small blocks or masses of any other shape, and sometimes even relatively coarse granules.

FIG. 1 shows a gas generator, as an embodiment of the invention, for use in a gas bag system in an automobile.

A generally cylindrical and flanged housing assembly 10 of this gas generator is designed such that the gas generator can be installed on a steering column of the automobile. The housing 10 is made up of a bottom plate 12 screw-fitted into a flanged annular body 14, a cylindrical wall 16 which is fixed at its one end to the body 14 and is formed with a multiplicity of radial holes 17 and a lid 18 which closes the other end of the cylindrical wall 16. The holes 17 in the cylindrical wall 16 serve as gas outlets of this gas generator. Using a tapped hole 13 bored in the center of the base plate 12, an electrically initiatable igniter 20 is secured to the housing 10 so as to intrude into the interior of the housing 10. A cylindrically shaped wire screen 22 of stainless steel is disposed in the housing 10 concentrically with and spaced from the cylindrical wall 16, so that the interior of the housing 10 is partitioned into a cylindrical central space and a radially outer annular space. Another cylindrically shaped wire screen 24 of stainless steel is arranged along and in contact with the inside of the perforated cylindrical wall 16. Indicated at 26 is a metal ring to hold the two wire screens 22 and 24 in proper positions. The igniter 20 occupies a small and central portion of the cylindrical space bounded by the wire screen 22, and the remaining major portion of this space is filled with a multitude of pellets 28 of a gas-generating composition, a mixture of sodium azide and potassium perchlorate. The annular space defined between the two wire screens 22 and 24 is entirely filled with granules 30 of silicon carbide. The openings of these wire screens 22 and 24 are smaller than the particle size of the individual granules 30 of silicon carbide, so that the granules 30 can be retained within the annular space.

Assembled with an inflatable bag (not shown), this gas generator is mounted on the steering column of a car. In case of a collision of the car, a current is supplied to the igniter 20 of the gas generator by the action of a shock sensor (not shown) installed on the car. Then the igniter 20 fires instantaneously to initiate combustive decomposition of the gas-generating composition 28. The high temperature nitrogen gas (about 2000° C.) generated by this reaction enters the annular cooling chamber through the wire screen 22 and passes through the innumerable and narrow gas passages provided by the silicon carbide granules 30 packed in the cooling chamber. Accordingly there occurs heat exchange between the high temperature nitrogen gas and the silicon carbide granules 30 such that the gas temperature greatly lowers before the arrival of the gas at the outer wire screen 24. For example, the gas temperature lowers to about 150° C. Through the wire screen 24 and the holes 17 in the wall 16, the cooled nitrogen gas is discharged from the gas generator to flow into the inflatable bag. As mentioned hereinbefore, the products of the decomposition of the gas-generating composition 28 include solid components such as sodium oxide and metallic sodium, but before cooling of the gas these components are mostly in the vaporized state. During passage of the gas through the column of the coolant granules 30, these components liquefy and deposit on the surfaces of the granules 30, and ultimately solidify.

Of course the design of the gas generator illustrated in FIG. 1 is only by way of example. In this example the coolant granules 30 are packed in an annular space concentrically surrounding a cylindrical reaction chamber, and the gas is discharged from the cylindrical housing 10 in radial directions. As a simple modification, an end wall corresponding to the lid 18 in FIG. 1 may be formed with gas discharge holes (instead of holing the cylindrical wall 16), and in this case the two cylidrically shaped wire screens 22 and 24 will be replaced by two flat wire screens arranged parallel to the apertured end wall so as to divide the interior of the housing into a cylindrical reaction chamber and a cylindrical cooling chamber axially adjacent the reaction chamber.

The invention will be further illustrated by the following examples.

EXAMPLE 1

A gas generator of the construction and design of FIG. 1 was produced in this example. The cylindrical wall 16 of the housing 10 had an inner diameter of 86 mm, and the gas discharge holes 17 were distributed uniformly over the entire circumference of this wall 16.

A 40-mesh wire screen (ASTM standard, 0.42 mm openings) of stainless wire was used as the material of the two cylindrically shaped screens 22 and 24. The inner screen 22 was shaped to have an inner diameter of 50 mm.

A nitrogen-generating composition used in this example was a mixture of 75 parts by weight of powdered sodium azide and 25 parts by weight of powdered potassium perchlorate. This powder mixture was press-formed into cylindrical pellets 28 each having a diameter of 10 mm and a length of 3 mm, and, after attachment of the igniter 20 to the housing 10, 130 g of the pellets 28 were charged into the cylindrical reaction chamber bounded by the inner wire screen 22.

Figure 2:
FIG. 2 is a photomicrograph of a granular silicon carbide used in an example of the invention.

The coolant 30 used in this example was granular α-silicon carbide commercially available as an abrasive. FIG. 2 is a 15 magnification photomicrograph of this silicon carbide, showing that the silicon carbide granules were sharp-edged and that the shape of the individual granules was far from spherical but was nearly pyramidical or prismatic. This silicon carbide was sieved to obtain the granules passed through ASTM 14-mesh screen (1.41 mm openings) but retained on ASTM 18-mesh screen (1.00 mm openings), and 510 g of the thus obtained silicon carbide granules 30 were charged into the annular cooling chamber defined between the two cylindrically shaped wire screens 22 and 24, resulting in that this chamber was entirely filled with the silicon carbide granules 30 in a closely packed state. Then the gas generator was completed by fixing the lid 19 to the cylindrical wall 16. In this example, the size ratio R of each silicon carbide granule to the openings of the wire screens 22 and 24 was calculated to be in the range from 3.4 to 2.4.

This gas generator was assembled with an inflatable bag which was made of nylon fabric with a rubber coating on the inside and had a volume of 70.2 liters in the expanded state. The performance of the gas generator was examined by continuously detecting a change in the gas pressure in the gas generator and a change in the gas pressure in the bag over a time period from the moment of the initiation of the igniter 20 to the occurrence of a substantial lowering of the bag pressure after completion of the inflation thereby to find a maximum chamber pressure $P_c$ in the gas generator, maximum bag pressure $P_B$ and a time period $t_i$ needed to complete the inflation of the bag. The pressure detection was accomplished by the use of two strain gauge type pressure pickups (one for the gas generator pressure had a maximum capacity of 100 kg/cm², and the other for the bag pressure had a maximum capacity of 1 kg/cm²) fitted to the base plate 12 of the gas generator, a dynamic stress-strain meter and an oscillograph. The result was as follows.

Max. chamber pressure Pc (gauge pressure): 60 kg/cm²
Max. bag pressure $P_B$ (gauge pressure): 0.12 kg/cm²
Bag inflation time $t_i$: 33 ms After this test, the solid matter contained in the gas flowed into the bag was recovered and dissolved in 1 liter of water. The quantity of the solid matter was determined by titration of the resulting aqueous solution with 1/10 N sulfuric acid using phenolphthalein as indicator. As the result, the quantity of the solid matter was 0.1 g as Na.

The heat-absorbing effect of the silicon carbide granules 30 can be judged from the gas temperature in the inflated bag. In reality, however, it is difficult to accurately measure the gas temperature in the bag by means of a thermocouple because the inflation of the bag is completed in a very short time as presented above. Therefore, the gas temperature in the inflated bag was calculated from the detected value of the maximum bag pressure $P_B$ by utilizing the Boyle-Charles' law, that is, by the following equation:

$$T_B = \frac{T_1 \cdot V_2}{V_1} (1 + P_B)$$

where $T_1 = 273°$ K., $V_1 = 50.4$ liters, $V_2 = 70.2$ liters. Therefore, $T_B = 380(1 + P_B) = 426°$ K. $= 153°$ C.

EXAMPLE 2

A gas generator was produced in accordance with Example 1 except that the quantity of the silicon carbide granules was decreased to 420 g, and this gas generator was tested exactly in accordance with Example 1. The test results obtained in Example 2 are presented in Table 2 together with the results of other examples and comparative experiments.

EXAMPLE 3

This example was generally identical with Example 1 except for the use of somewhat coarser granules of the silicon carbide. In this example, use was made of silicon carbide granules passed through ASTM 12-mesh screen (1.68 mm openings) but retained on ASTM 14-mesh screen (1.41 mm openings).

EXAMPLE 4

This example, too, was generally identical with Example 1 except for the use of finer granules of silicon carbide. In this example, use was made of silicon carbide granules passed through ASTM 18-mesh screen but retained on ASTM 30-mesh screen (0.59 mm openings).

REFERENCE 1

As an experiment comparative with Example 1, a gas generator fundamentally identical with that of Example 1 was produced by using 510 g of granular α-alumina (a commercial abrasive) in place of the granular silicon carbide in Example 1. The particle size of the alumina granules was similar to the particle size of the silicon carbide granules used in Example 1.

REFERENCE 2

This was similar to Reference 1 except for the use of finer granules of α-alumina, i.e. α-alumina granules passed through the 18-mesh screen but retained on the 30-mesh screen.

REFERENCE 3

This experiment was similar to Example 1 except that a finer screen, that is, an 80-mesh wire screen (0.177 mm openings) of stainless steel was used as the material of the two cylindrically shaped wire screens 22 and 24.

REFERENCE 4

Also this example was similar to Example 1 except for the use of a coarser screen, that is, an 18-mesh wire screen (1.00 mm openings) as the material of the two cylindrically shaped wire screens 22 and 24.

The following conclusions can be drawn from the experimental results in Table 2.

(1) In the case of the gas generator of Example 1 which comprised 510 g of silicon carbide granules larger than about 1.0 mm but smaller than about 1.4 mm, the gas temperature $T_B$ in the inflated bag was as low as 153° C. In comparison, the use of the gas generator of Reference 1 which comprised the same quantity of alumina granules of substantially the same particle size resulted in that the gas temperature $T_B$ was as high as 221° C. This comparison demonstrates superiority in heat-absorbing ability of silicon carbide over alumina, a typical example of conventional heat-absorbing materials.

(2) From the same viewpoint, Reference 2 is comparative with Example 4. Although the silicon carbide granules in Example 4 were similar to the alumina granules in Reference 2 both in quantity and particle size, the gas temperature $T_B$ in the bag in Example 4 was lower than that in Reference 2 by more than 50° C. This comparison, too, is an evidence of a superior cooling ability of silicon carbide.

(3) In Example 2, the quantity of the silicon carbide granules was decreased to such an extent that the gas temperature $T_B$ in the inflated bag became comparable to the gas temperature $T_B$ in Reference 1 where use was made of 510 g of alumina granules similar in particle size to the silicon carbide granules in Example 2. These results show that a gas temperature reduction achievable by the use of a quantity of α-alumina granules can be achieved by an about 20% smaller quantity of α-silicon carbide granules.

(4) In Example 3, the particle size of the silicon carbide granules was made larger than that in Example 1 such that the cooling effect represented by the gas temperature $T_B$ lowered to the level observed in Reference 1. As can be seen, the use of about 1.4–1.7 mm coolant granules in Example 3 compared with about 1.0–1.4 mm coolant granules in Reference 1 resulted in an about 15% lowering of the maximum chamber pressure $P_c$ which was 61 kg/cm² in Reference 1. This fact demonstrates that a slight enlargement of the particle size of the coolant granules packed in the gas generator brings about a considerable lessening of the resistance offered by the packed granules to the flow of the generated gas therethrough.

(5) The combustion of 130 g of the gas-generating composition used in Examples and References pro-

TABLE 2

| | Coolant | | Wire Screens, 22 & 24 | Size Ratio, R | Max. Chamber Pressure, $P_c$ (kg/cm²) | Max. Bag. Pressure, $P_B$(kg/cm²) | Gas Temperature, $T_B$ (°C.) | Bag Inflation Time, $t_f$ (ms) | Solid Matter, as Na (g) |
|---|---|---|---|---|---|---|---|---|---|
| | Particle Size(mm) | Weight (g) | | | | | | | |
| Ex. 1 | α-SiC | 1.00~1.41 | 510 | 40-mesh | 3.4~2.4 | 60 | 0.12 | 153 | 33 | 0.1 |
| Ex. 2 | α-SiC | 1.00~1.41 | 420 | 40-mesh | 3.4~2.4 | 55 | 0.29 | 217 | 35 | 0.2 |
| Ex. 3 | α-SiC | 1.41~1.68 | 510 | 40-mesh | 4.0~3.4 | 52 | 0.28 | 213 | 35 | 0.2 |
| Ex. 4 | α-SiC | 0.59~1.00 | 510 | 40-mesh | 2.4~1.4 | 62 | 0.10 | 145 | 36 | 0.1 |
| Ref. 1 | α-Al₂O₃ | 1.00~1.41 | 510 | 40-mesh | 3.4~2.4 | 61 | 0.30 | 221 | 34 | 0.2 |
| Ref. 2 | α-Al₂O₃ | 0.59~1.00 | 510 | 40-mesh | 2.4~1.4 | 65 | 0.25 | 202 | 35 | 0.1 |
| Ref. 3 | α-SiC | 1.00~1.41 | 510 | 80-mesh | 8.0~5.7 | 65 | 0.09 | 141 | 34 | 0.2 |
| Ref. 4 | α-SiC | 1.00~1.41 | 510 | 18-mesh | 1.4~1.0 | 52 | 0.30 | 221 | 36 | 1.2 | duced metallic sodium and sodium oxide in a total quantity of 34.5 g as Na. However, in every Example (even in Example 3 where use was made of a relatively coarse granules of silicon carbide) the silicon carbide granules in the gas generator were highly effective for filtering or trapping the solid components of the reaction products.

(6) Reference 3 was comparative with Example 1 in regard of the size ratio R, i.e. the ratio of the particle size of each silicon carbide granule to the size of the openings of the wire screens 22 and 24 bounding the cooling chamber. The employment of excessively large values for this ratio R in Reference 3 resulted in an about 10% rise in the maximum chamber pressure $P_c$ compared with the result in Example 1. This fact supports the presumption that the openings of the wire screens 22 and 24 are partly choked with the coolant granules when the openings are unduly small relative to the particle size of the coolant granules.

(7) In Reference 4 the size ratio R was considerably lower than in Example 1. Then the gas temperature $T_B$ rised by about 70° C., and more than tenfold increase occurred in the quantity of the solid residues discharged from the gas generator. In addition, it was observed in Reference 4 that 34 g of the silicon carbide granules had been injected into the inflated bag. A portion of these silicon carbide granules remained adhered to the inside of the bag, and it was perceptible to the eye that the rubber coating had melted in the regions spattered with the silicon carbide granules. Therefore, it can be concluded that excessively large openings of the wire screen 24 caused local enlargement of the gas passages in the cooling chamber such that a certain amount of the generated gas flowed into the bag in an only insufficiently cooled state.

As will have been understood from the foregoing description, a gas generator according to the invention comprising granular silicon carbide, particularly α-SiC, as a heat-absorbing material is distinctly advantageous in many points over conventional gas generators utilizing other kinds of solid coolants. The advantages gaind by the invention are summarized as follows.

First, the use of silicon carbide which has an exceedingly high heat-absorbing ability makes it possible to considerably decrease the weight of solid coolant per unit weight of gas-generating composition, so that the total weight of each gas generator can be decreased. Also, the high heat-absorbing ability of silicon carbide allows of using this material in the form of granules coarser than coolant granules in conventional gas generators to facilitate passing of the generated gas through the cooling chamber, with a consequential lowering of the maximum gas pressure in the gas generator during operation thereof. Accordingly the gas generator housing can be made less resistant to pressure and hence lighter in weight. This leads to a further reduction of the total weight of the gas generator. A reduction of weight with no sacrifice of gas-generating ability is particularly favorable to gas generators for automotive uses. For example, an unfavorable influence of the attachment of a gas generator to the steering column on the ease of steering is diminished by weight reduction of the gas generator.

The solid coolant according to the invention is not inferior to conventionally used solid coolants in the ability of trapping or filtering solid matter contained in the generated gas, so that a gas generator of the invention can discharge a clean and harmless gas. Besides, this coolant is a chemically stable compound, so that the gas generator is high in stableness and can be preserved or kept ready for operation for a long period of time with little changes in its performance with the lapse of time.

By using silicon carbide granules most of which are sharp-edged and nearly prismatic or pyramidical as preferred in the invention, both the heat-absorbing efficiency and solid matter trapping efficiency of the coolant in the gas generator can be enhanced owing to an increased surface area per unit weight of the coolant and complicated gas passages in the packed coolant.

In a gas generator of the invention, the granules of α-silicon carbide, a material having a high hardness and preferred in this invention, are hardly crushed or pulverized even though the gas generator experiences mechanical vibrations such that the granules are forced to rub against one another. Therefore, the maximum gas pressure in the gas generator during its operation is not influenced by vibrations or other mechanical stresses exerted on the gas generator before operation, meaning that this gas generator has a high reliability. A very high melting point of α-silicon carbide is also favorable to the reliability of the gas generator. Since to be very high in melting point means to be high in heat-resistance and, during operation of the gas generator, to have no possibility of melting and choking the openings of the wire screens bounding the cooling chamber, there is no possibility of the granular coolant causing an unexpected rise in the maximum gas pressure in the gas generator.

What is claimed is:

1. A gas generator of use for inflating gas bags, comprising:

a housing having a wall formed with a plurality of gas discharge apertures;

a first metal partition arranged in said housing at a distance from said wall so as to define a reaction chamber which is spaced from said wall in the interior of said housing;

a second metal partition arranged in said housing along the inside of said wall such that a cooling chamber is defined between said first and second partitions;

a plurality of pellets of a solid gas-generating composition which undergoes an exothermic and self-sustaining reaction when ignited with generation of a heated reaction gas confined in said reaction chamber;

an electrically initiatable ignition device attached to said housing so as to be able to ignite said pellets; and granules of α SiC confined in said cooling chamber to absorb heat from said reaction gas during passage of said reaction gas through said cooling chamber, at least a major amount of said granules individually having sharp-edged shapes;

each of said first and second metal partitions being a wire screen so that said reaction gas is allowed to pass therethrough, the ratio of the particle size of each of said granules of α SiC to the size of each opening of said wire screen being in the range from 4.0 to 3.4, said granules having a size such that they pass through a 12-mesh screen and are retained on a 14-mesh screen.

2. A gas generator according to claim 1, wherein said wall of said housing is a cylindrical wall, said first metal partition being generally cylindrical and arranged substantially concentrically with said cylindrical wall so that said reaction chamber is generally cylindrical while said cooling chamber has a generally annular cross-sectional shape and surrounds said reaction chamber.

3. A gas generator according to claim 1, wherein said gas-generating composition is a composition which generates nitrogen gas as at least a major portion of said reaction gas.

4. A gas generator according to claim 3, wherein said gas-generating composition comprises a metal azide.

* * * * *